251-25
SEARCH ROOM
BEST AVAILABLE COPY
J. E. Gillespie,
Governor.
No. 8,410. Reissued Dec. 4, 1860.
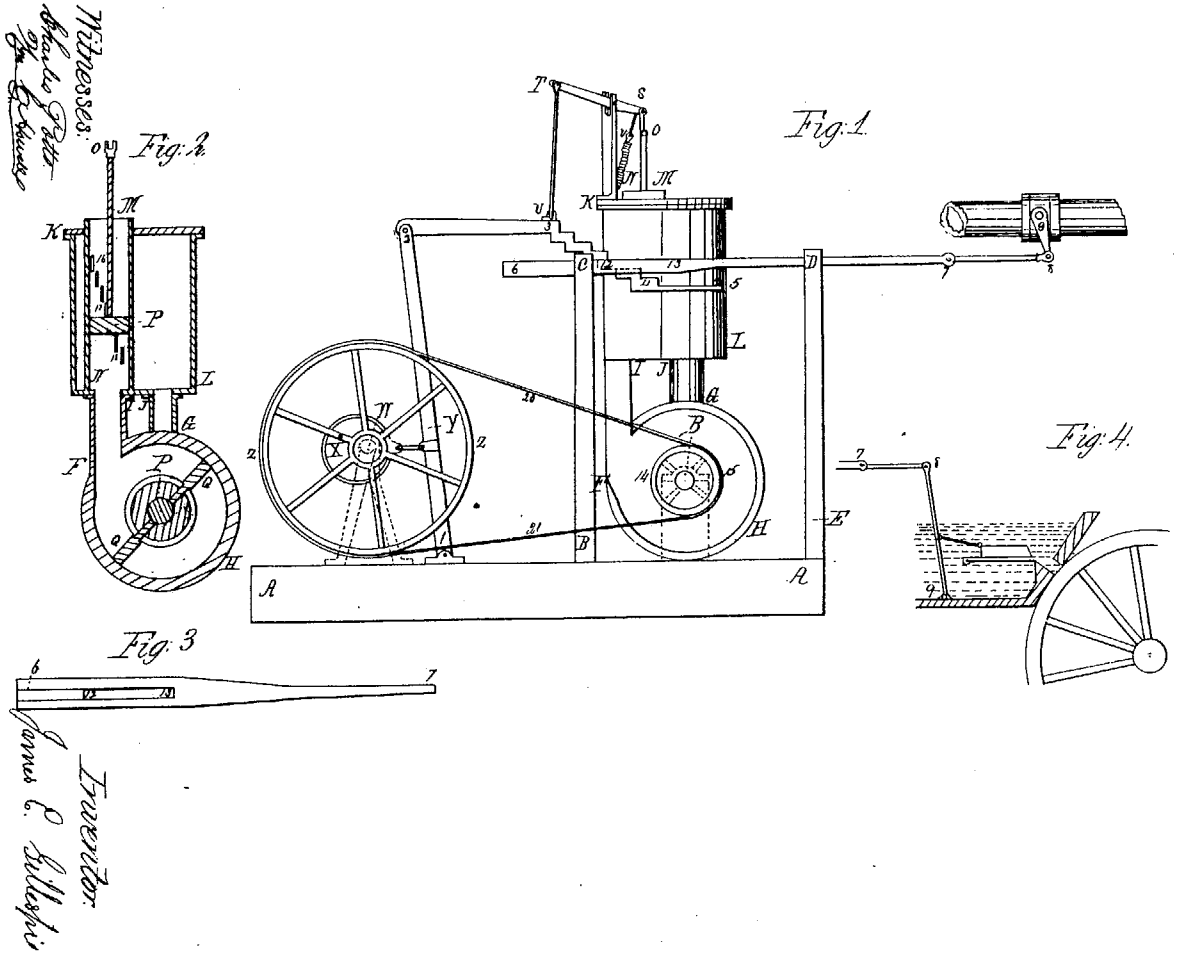
Witnesses:
Charles Potts
Wm. C. Howells
Inventor:
James E. Gillespie
N. PETERS, PHOTO-LITHOGRAPHER, WASHINGTON, D. C.

United States Patent Office.

IMPROVEMENT IN HYDRAULIC GOVERNOR.

THE GILLESPIE GOVERNOR COMPANY, ASSIGNEES OF JAMES E. GILLESPIE, OF BOSTON, MASSACHUSETTS.

*Letters Patent No.* 34,055, *dated January* 7, 1862; *reissue No.* 2,410, *dated December* 4, 1866.

SPECIFICATION.

TO ALL WHOM IT MAY CONCERN:

Be it known that I, JAMES E. GILLESPIE, formerly of the city of Trenton, in the county of Mercer, and State of New Jersey, but now of Boston, in the county of Suffolk, in the State of Massachusetts, have invented a new and improved Hydraulic Governor for regulating the speed of steam and other engines, including water-wheels; and I do hereby declare that the following is a full, clear, and exact description of the construction and operation of the same, reference being had to the accompanying drawings, making part of this specification, in which—

Figure 1 is an elevation or side view of a machine or governor embodying my invention.

Figure 2 is a vertical section taken through the middle of the pump, the cylinder, and its jacket; and Figures 3 and 4 are representations of some of the details involved and modifications thereof.

The same letters of reference are applied to similar parts of the machine, in the respective figures of the drawing.

In fig. 1, A A represent the foundation, floor, or bed-plate on which the machine is erected. B C and D E, are two posts or standards. F G H is a rotary or centrifugal pump, and R is the axis or shaft on which the pistons, Q Q, (in fig. 2,) of the rotary or the wings of the centrifugal pump are attached. K L is a jacket or tank, and M N (fig. 2) is a cylinder placed inside of said tank. This cylinder is connected at the lower end with the pump, by the tube or pipe, F I, through which the water from the pump is forced or driven upwards into said cylinder. G J represents another pipe or tube extending from the bottom of the tank, K L, to the centre opening of the pump, and by which the pump is to be supplied with water from said tank. O P is the piston-rod of a piston, P, fitted to work freely in the bore of the cylinder. 16, 17, 18, represent a series of openings or perforations made through the side of the cylinder. Z Z represents the driving-wheel, drum, or pulley, from which the belt, 20, 21 passes over the small drum or pulley, 14, 15, fastened on the shaft, R, of the pump, F G H. X is an eccentric, fitted on the shaft or axle, W, of the driving pulley, and rotating with it. 1, 2 is a lever, having its fulcrum at 1, and connected with the strap or hoop of the eccentric at Y, by means of a connecting link or rod. 2, 3, 4, 5, represent a bar or rod pivoted at 2 to the upper end of the lever, 1, 2. The end, 3, 4, 5, of this bar, is formed into a series of steps or notches; this bar, I shall hereinafter term the zigzag bar. 6, 7 is a bar or rod guided and made to slide freely on the standards, B C and D E. Said bar has a long slit or slot formed in it, (as shown at 12, 13, fig. 3,) through and in which the zigzag bar passes and by which bar the bar 6, 7 is moved back and forth. S T is a lever supported by a standard over the tank; it is connected at one end by the link, S O, with the piston-rod, and at the other end by the rod, T U, with the zigzag bar. S V represents a spiral spring, connected with the end, S, of the lever, S T, the function of said spring being to react against the column of fluid thrown against the piston, P, by the pump. 7, 8 is a link or rod connecting the slotted bar 6, 7, with the lever 8, 9, of a throttle valve of a steam engine, as in fig. 1, or the gate of a water-wheel, as in fig. 4.

The operation of my improved hydraulic governor is as follows: Water poured into the tank K L, will descend thence through the tube, J G, into the chamber of the pump, and motion being communicated to the pump from a steam engine (or water-wheel) or from the mechanism thereby operated, the water will be forced up the tube F I into the cylinder, and against its piston, P. The action of the eccentric, X, at the same time will cause the lever 1, 2, to vibrate back and forth, and this will reciprocate the zigzag bar in and along the slot 12, 13, of the bar 6, 7, and the extent to which this latter bar will thus be pushed out or drawn in, will depend on the elevation of the zigzag bar in said slot. When the several parts, therefore, of the machine, have been adjusted to the required speed of the engine, it is plain that should the velocity become increased, the pump would throw an increased amount of water into the cylinder, which will raise the piston, and this will cause the zigzag bar to descend more into the slot 12, 13, and thereby draw back the bar 6, 7, and with it the lever of the connected valve or gate, cutting off partially the supply of steam or water, and thus reducing the velocity to the required speed. Again, on the other hand, should the velocity of the engine decrease below the required standard, the piston in the cylinder will descend and raise the zigzag bar, so as to push the slotted bar further out, and thus open the valve or gate, thereby causing the speed to increase until it has attained the required velocity. When a rotary or any other kind of forcing pump is used to raise the water into the cylinder, M N, the said column of water therein will continue to raise and elevate the piston, P, until the flow of water through the perforations 16, 17, 18, is equal to the flow of the water thrown by the pump. The water which passes through the perforations, flows into the tank or jacket, K L, and thence back to the pump. When a centrifugal pump is applied to raise the water, inasmuch as the height of the column raised would be in proportion to the centrifugal force exerted, it is obvious that the perforations in the cylinder, in this case, may be dispensed with. To aid the piston to descend freely into the chamber of the cylinder, I propose, on land or stationary engines, to suspend a weight, and on marine engines, to attach a spring, as S V, to the end, S, of the lever, S T. This weight may be suspended on said lever, S T, somewhat like the weight on the common steelyard, so as to be shifted from one point to another when required, and the spring, when used, should have a link thereon, as seen at 10, having an adjusting screw thereon, so as to lengthen or shorten the connections thereof. With this weight or spring attached as above mentioned, when the governor has been adjusted, to any particular speed, it becomes easy to change the same, from time to time, as may be required, simply by changing the position of said weight on the lever, or changing the tension of the spring. Other fluids besides water may be advantageously used as the medium of transmitting the action of the pump to the piston in the cylinder; oil, for instance, which would answer as well or better than water, and in cold situations, fluids which freeze at very low temperatures may be employed. I would also here remark that I prefer either the rotary or centrifugal pump, in the practical organization of my improved hydraulic governor, but it is obvious that any of the ordinary force or plunger pumps can be readily applied so as to produce similar results.

I claim the combination, with a valve or with a water-gate, and for the purpose of automatically governing or controlling the position thereof, in order to regulate the flow of fluid past such valve or gate, of a pump, a cylinder, and its piston, and a notched bar, or the equivalent of these, operating together substantially as described.

J. E. GILLESPIE

Witnesses:
F. GOULD,
L. H. LATIMER.